Figure 1:
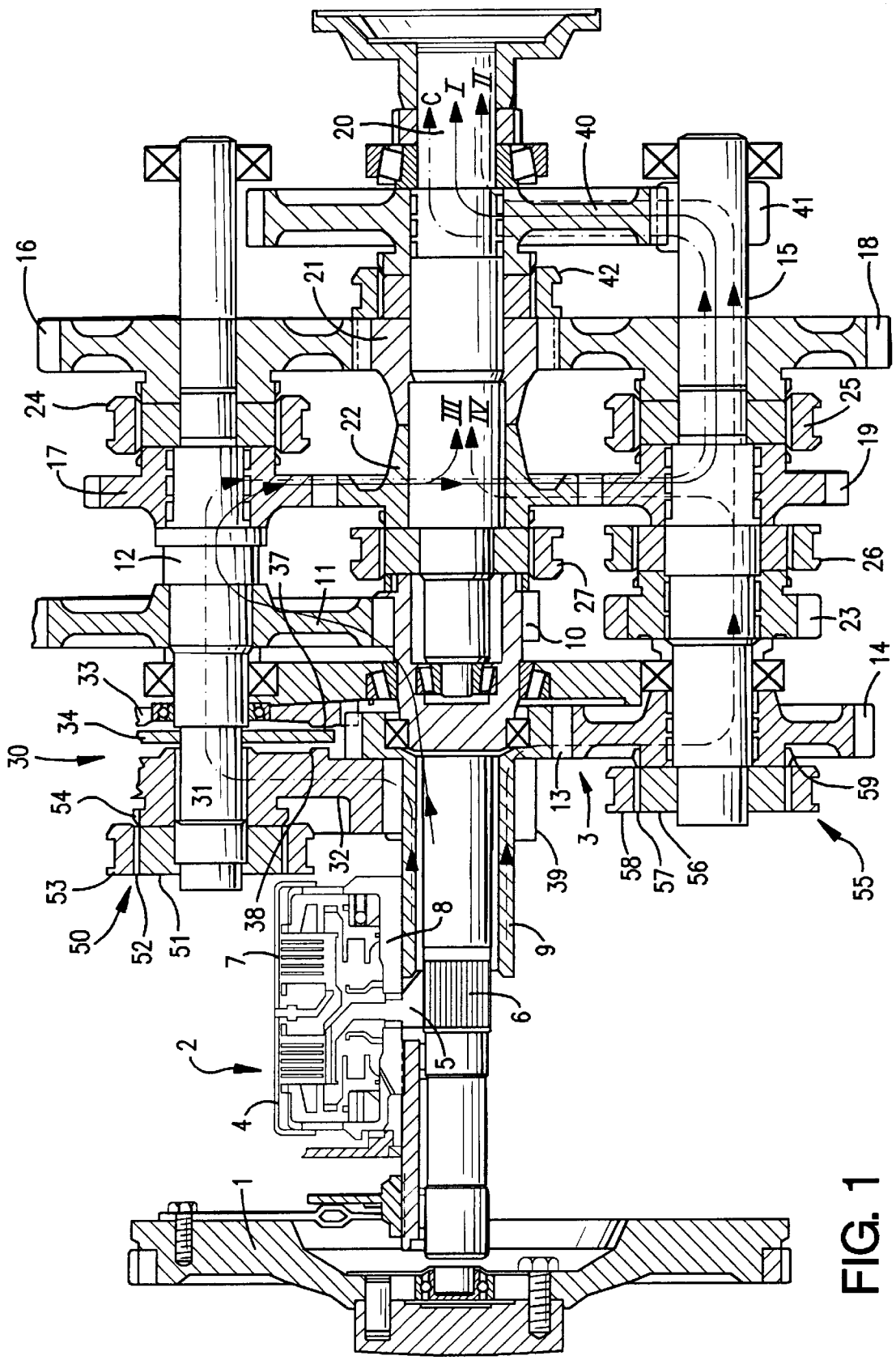

United States Patent [19]
Hedman

[11] Patent Number: 5,974,905
[45] Date of Patent: Nov. 2, 1999

[54] MOTOR VEHICLE GEARBOX

[75] Inventor: Anders Hedman, Marstrand, Sweden

[73] Assignee: AB Volvo, Goteborg, Sweden

[21] Appl. No.: 09/142,136

[22] PCT Filed: Mar. 7, 1997

[86] PCT No.: PCT/SE97/00397

§ 371 Date: Sep. 2, 1998

§ 102(e) Date: Sep. 2, 1998

[87] PCT Pub. No.: WO97/33103

PCT Pub. Date: Sep. 12, 1997

[30] Foreign Application Priority Data

Mar. 8, 1996 [SE] Sweden .................................. 9600921
Sep. 20, 1996 [SE] Sweden .................................. 9603441

[51] Int. Cl.⁶ ........................................................ F16H 3/12
[52] U.S. Cl. ................................................. 74/331; 74/339
[58] Field of Search ...................................... 74/331, 339

[56] References Cited

U.S. PATENT DOCUMENTS

Re. 33,551  3/1991  Andersson et al. ........................ 74/331
2,612,787  10/1952  Youngren et al. .
4,727,764  3/1988  Klaue .
4,876,907  10/1989  Andersson et al. ........................ 74/331
5,150,628  9/1992  Alfredsson ................................ 74/331

FOREIGN PATENT DOCUMENTS 458 846  5/1989  Sweden .

*Primary Examiner*—Dirk Wright
*Attorney, Agent, or Firm*—Young & Thompson

[57] ABSTRACT

A motor vehicle gearbox with two concentrically mounted input shafts, each driving an individual layshaft, having gears in engagement with gears on an output shaft. One layshaft has a central synchronizing device, by means of which the layshaft, which is driveably coupled to the momentarily non-driven input shaft, can be accelerated up to a rotational speed determined by the selected gear speed. The central synchronization device has a friction clutch and two synchronization gears, one of which is wider than the other and is lockable to the shaft with the aid of an engaging sleeve, so that driving torque can be transmitted via the synchronization gear.

12 Claims, 2 Drawing Sheets

MOTOR VEHICLE GEARBOX

The present invention relates to a motor vehicle gearbox, comprising two concentrically arranged alternately driveable first and second input shafts, first and second layshafts, pringary gears carried by the first input shaft and the first layshaft, said pringary gears engaging each other for transmitting torque from the first input shaft to the first layshaft, pringary gears carried by the second input shaft and the second layshaft, said pringary gears engaging each other for transmitting torque from the second input shaft to the second layshaft, an output shaft, gears carried by the layshafts and the output shaft, said gears engaged in each other in pairs for transmitting torque from either layshaft to the output shaft and of which at least one gear in each pair is a releasable idler gear, and synchronizing means comprising firstly, a pair of synchronizing gears rotatably mounted on one of the layshafts, said gears being in driving engagement with gear rings on one input shaft, and secondly friction means, by means of which a driving connection between one synchronizing gear and the shaft can be established to adapt the rotational speed of the layshaft which is driveably coupled to the momentarily undriven input shaft, to a rotational speed determined by the selected gear speed.

A gearbox of the above stated construction is known by SE-A-8700583. It is a so called power shift gearbox with a two-position central synchronization, whereby six synchronizing functions are obtained in a seven speed gearbox with only two synchronizing gears and a synchronizing clutch on only one of the layshafts. This provides a basic construction which is compact and easily achieved with very short shafts. The latter is advantageous with respect to torque capacity and gear and bearing life.

The purpose of the present invention is, in a gearbox of the type described by way of introduction, to increase the number of gear speeds in the most economical manner as regards design and cost.

This is achieved according to the invention by virtue of the fact that that at least one of the synchronizing gears is co-ordinated with engaging means which permit transmission of higher torque to its layshaft than what is required for said rotational speed adaptation.

The invention is based on the idea of reinforcing the engaging force and the torque transmission capacity of at least one synchronizing gear so that the gear is not only used to accelerate an essentially unloaded layshaft during the synchronizing phase but also can be used to transmit driving torque. In practise this is achieved in the known gearbox described by way of introduction which has very narrow synchronizing gears only dimensioned for the synchronizing torque, by broadening the gear and for example providing it with engaging means with a positive connection instead of merely a frictional engagement. In this manner it is possible to provide an extra gear speed, for example a so called crawl gear with a higher gear ratio than the lowest gear speed in the known gearbox, or an overdrive with a lower gear ratio than the highest gear of the known gearbox.

The invention will be described in more detail with reference to examples shown in the accompanying drawings, where FIG. 1 shows a longitudinal section through a gearbox with seven ordinary speeds forward as well as a crawl gear and reverse.

Figure 2:
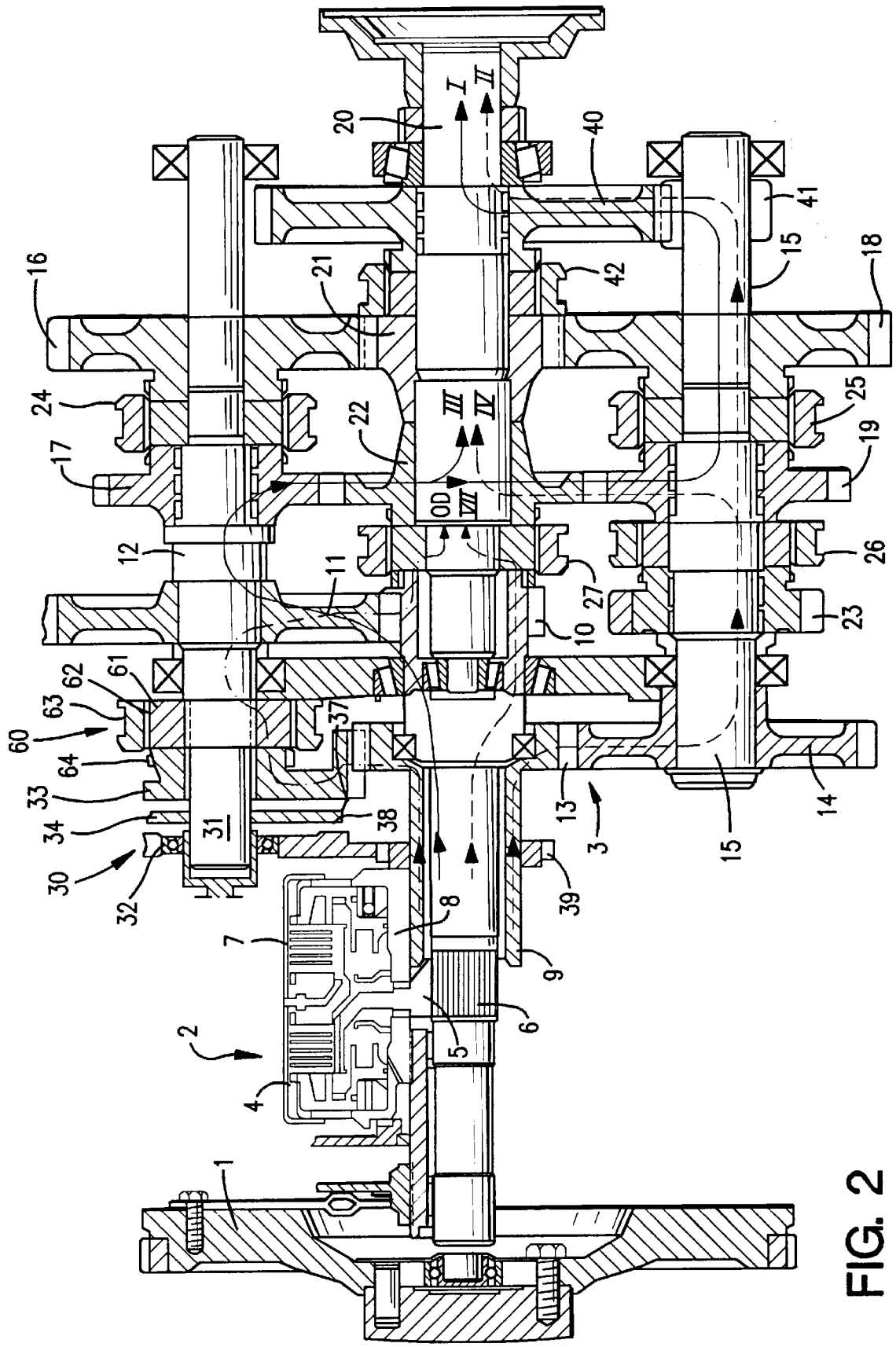

FIG. 2 is a longitudinal section through a gearbox with seven ordinary forward gear speeds as well as overdrive and reverse.

1 in the figures designates an engine fly wheel, which via a multi-disk wet disk clutch, generally designated 2, drives a gearbox 3 according to the invention. The clutch 2 is a double clutch of a type known per se and therefore it does not need to be described in more detail here. The left hand clutch unit 4 seen in the figure is coupled via a sleeve element 5 to a first input shaft 6 in the gearbox, while the right hand clutch unit 7 is coupled via a sleeve element 8 to a second input shaft 9 in the form of a hollow shaft mounted concentrically with the first shaft 6. The two clutch units can be alternatively engaged and disengaged to alternately drive the input shafts 6 and 9. The wet disk clutch shown can be replaced by a double dry disk clutch.

The first input shaft 6 is provided with a gear ring 10, in engagement with a gear 11 which is solidly mounted on a first layshaft 12. The second input shaft 9 is made with a gear ring 13 which is in engagement with a gear 14 which is mounted on a second layshaft 15. The gear ring 13 is larger than the gear ring 10, which means that the second layshaft 15 will rotate more rapidly than the first layshaft 12 at the same input rpm for the respective input shaft.

The layshafts 12 and 15 respectively each support a pair of freely rotatably mounted gears 16, 17 and 18, 19 respectively, of which the gears 16, 18 are both in engagement with a gear 21 fixedly mounted on the output shaft 20, and the gears 17, 19 are in engagement with a gear 22 which is rotatably mounted on the output shaft and can be locked to the shaft with the aid of an engaging sleeve 27. The shafts are arranged in a V shape in order to make it possible, with the aid of an extra gear 23 on the layshaft 15, said gear engaging the gear 11 on the layshaft 12, to reverse the rotational direction of one of the layshafts for proviging a reverse gear. It is also possible to reverse the rotational direction of the respective layshaft by means of a gear mounted on a separate shaft in the housing, said gear engaging the gear rings 10 and 23. This provides a freer selection of V shape and gear ratios and also permits the shafts to be placed in the same plane. The gears 16, 17, 18, 19 and 23 are lockable to their shafts with the aid of axially displaceable engaging sleeves 24, 25 and 26. A gear 40 freely rotatably mounted on the output shaft 20 engages the gear ring 41 integral with the layshaft 15 and is lockable to the shaft 20 by means of an engaging sleeve 42. By cutting the gear ring 41 directly in the layshaft 15 and arranging the gear 40 lockable to the output shaft, the need for needle bearings on the layshaft is eliminated and the gear can be made with a very small diameter, which in turn provides a higher gear ratio from the layshaft to the output shaft. With the aid of the engaging sleeve 27, the input shaft 6 and the output shaft 20 can be locked together for direct drive. All of these engaging sleeves are without individual, conventional synchronizing devices.

The first layshaft 12 is instead co-ordinated with a central synchronizing device generally designated 30. It comprises a pair of gears 32, 33 freely rotatably mounted on an extension 31 of the layshaft 12 with a clutch disk 34 therebetween. The clutch disk 34 is axially displaceable but non rotatably mounted relative to the shaft 12 by means of splines. The clutch disk is joined to operating means, not shown in more detail here, for controlling the shifting. The synchronizing gears 32, 33 have on their sides facing the disk 34 frictional surfaces 37, 38. The left hand gear 32 engages a gear ring 39 on the second input shaft 9. The gear ring 39 has a smaller diameter than the gear ring 10 on the first input shaft. The right hand synchronizing gear 33 engages the gear ring 13 on the second input shaft and here there is preferably a difference of one or two gear teeth between the synchronizing gear 33 and the driven gear 14 on the second layshaft.

In the figure, the gearbox is shown in the neutral position with the two clutch units 4 and 7 released. If for example the second gear is to be engaged this is done by displacing the engaging sleeve 42 to the right thus locking the gear 40 to the output shaft 20. The clutch unit 7 is thereafter engaged while the clutch unit 4 remains released. When third gear is to be engaged, which is done by locking the gear 17 to the layshaft 12 with the aid of the engaging sleeve 24, the speed of the shaft 12 must be adapted to the speed of the shaft 15. This is done by displacing the clutch disk 34 of the synchronizing device 30 to the left against the gear 32 which is locked to the shaft 12.

After the sequence described, which can be called presynchronization and which involves preselection of third gear while driving in second gear, the actual shifting occurs by releasing the clutch unit 7 and engaging the clutch unit 4. The presynchronization accounts for approximately half of the synchronizing work and since it is done during normal driving it can be done relatively slowly, which is an advantage with regard to dimensioning.

When preselecting fourth gear, which is done by locking the gear 19 to the layshaft 15, the speed of the shaft 15 must be adapted to the speed of the shaft 12, since the gear 19 rotates at the same rotational speed as the gear 17. This is done by moving the clutch disk 34 to the right against the gear 33 which thus locks to the shaft 12 and drives the shaft 15, via the gear ring 13 and the gear 14. By, as mentioned above, seeing to it that the shaft 15 and the gear 18 have a minor speed difference, the engaging sleeve 25 can be displaced into engagement with the gear 18 without risk that the teeth of the respective engaging means will be in such a position that shifting will be blocked.

When preselecting fifth gear, the rotational speed of the layshaft 12 must be changed to essentially the rotational speed of the gear 17, i.e. a speed lower than the speed of the layshaft 15. This is done by moving the synchronizing clutch 34 to the left in the figure to engage the synchronizing gear 32, whereafter the actually shifting is effected by releasing the clutch unit 7 and engaging the clutch unit 4. Continued shifting up to sixth and seventh gear is done in a corresponding manner by locking the synchronizing gears 32, 33 alternately to the layshaft 12.

When reversing, the gear 32 is locked with the aid of the engaging sleeve 26. Depending on which of the clutches, 4, 7 are engaged the rotational direction of either the layshaft 12 or the layshaft 15 can be reversed, and a total of five reverse gears can be obtained by locking one of the gears 16, 17, 18, 19, 40. By direct coupling via the engaging sleeve 27, a sixth reverse gear can be obtained.

There has been described above the synchronizing function of the synchronizing gears 32, 33, when they are locked to the layshaft 12 with the aid of the clutch disk 34. In order to also use the synchronizing gear 32 for torque transmission, in the embodiment shown in FIG. 1, the gear 32 has been made wider than the gear 33 and is co-ordinated with an engaging arrangement 50, which provides positive engagement. The engaging arrangement 50 comprises a hub 51 solidly joined to the layshaft 12. The hub has external splines 52 which engage corresponding internal splines on an engaging sleeve 53. The gear 32 is provided with a splined ring 54. The pringary gear 14 of the layshaft 15 is freely rotatably mounted on the shaft and is co-ordinated with an engaging arrangement 55 which comprises a hub 56 solidly joined to the layshaft 15. The hub 56 has external splines 57 engaging corresponding internal splines on an engaging sleeve 58. The gear 14 is provided with a splined ring 59.

When torque is to be transmitted via the synchronizing gear 32, the gear is locked to the shaft by displacing the engaging sleeve 53 axially so that its splines engage the splines 54 of the gear 32. Immediately preceding this, the pringary gear 14 has been released from the layshaft 15 by displacing the engaging sleeve 58 to the position shown on the figure. The torque is now transmitted as indicated by the dot-dashed line on the figure to provide one gear speed, a so called crawl gear, which has a somewhat higher gear ratio than first gear.

Within the scope of the invention it is also conceivable to use, instead of an engaging arrangement 50 with splines, a friction clutch which can transmit greater torque than the synchronizing clutch 30. This friction clutch can for example by a multi-disk disk clutch, which can also assume the function of the synchronizing clutch.

In the embodiment shown in FIG. 2, the synchronizing gear 33 is instead wider than the gear 32 and is co-ordinated with an engaging arrangement 60 which provides positive engagement. The engaging arrangement 60 comprises a hub 61 fixedly joined to the layshaft 12 and having external splines 62 engaging corresponding internal splines on an engaging sleeve 63. The gear 33 is provided with a splined ring 64.

When torque is to be transmitted via the synchronizing gear 33, the gear is locked to the shaft by axial displacement of the engaging sleeve 63 so that its splines engage the splines 64 of the gear 33. Torque is now transmitted as indicated by the dot-dashed line in the figure, thus providing a gear speed, an overdrive which achieves a higher rpm of the output shaft 20 than of the input shaft 6.

It is also possible in this case to use, instead of an engaging arrangement 60 with engaging splines, a friction clutch which can transmit greater torque than the synchronizing clutch 30. This friction clutch can for example be a multi-disk clutch, which can also assume the function of the synchronizing clutch.

I claim:

1. Motor vehicle gearbox, comprising two concentrically arranged alternately driveable first and second input shafts, first and second layshafts, pringary gears carried by the first input shaft and the first layshaft, said pringary gears engaging each other for transmitting torque from the first input shaft to the first layshafts, pringary gears carried by the second input shaft and the second layshaft, said pringary gears engaging each other for transmitting torque from the second input shaft to the second layshaft, an output shaft, gears carried by the layshafts and the output shaft, said gears engaging each other in pairs for transmitting torque from either layshaft to the output shaft and of which at least one gear in each pair is a releasable idler gear, and synchronizing means comprising firstly, a pair of synchronizing gears rotatably mounted on one of the layshafts, said gears being in driving engagement with gear rings on one input shaft, and secondly friction means, by means of which a driving connection between one synchronizing gear and the shaft can be established to adapt the rotational speed of the layshaft which is driveably coupled to the momentarily undriven input shaft, to a rotational speed determined by the selected gear speed, characterized in that at least one of the synchronizing gears (32, 33) is co-ordinated with engaging means (60, 70) which permit transmission of higher torque to its layshaft (12) than what is required for said rotational speed adaptation.

2. Gearbox according to claim 1, characterized in that one synchronizing gear (32, 33) is co-ordinated with a separate engaging arrangement (50, 60) which permits transmission of higher torque to its layshaft (12) than the frictional means (34).

3. Gearbox according to claim 1, characterized in that the pringary gear (14) of the second layshaft is co-ordinated with coupling means (5), by means of which the pringary gear is releasable from or lockable to the shaft.

4. Gearbox according to claim 1, characterized in that the synchronizing gear (32) co-ordinated with the engaging means (50) engages a gear ring (39) on one input shaft (9), and that the gear ratio therebetween is greater than the gear ratio between the pringary gear (10) of the second input shaft (6) and the pringary gear (11) on the layshaft (12) engaging therewith.

5. Gearbox according to claim 4, characterized in that the synchronizing gear (32) co-operating with the engaging means (50) engages with a gear ring (39), arranged on one of the input shafts (9), said gear ring having a smaller diameter than the pringary gear of the other input shaft (6).

6. Gearbox according to claim 2, characterized in that the synchronizing gear (32) co-operating with the engaging means (50) has a gear ring having a greater axial extent than the gear ring of the second synchronizing gear (33).

7. Gearbox according to claim 2, characterized in that the engaging means (50) comprise an engaging hub (51) non-rotatably joined to the associated layshaft, said engaging hub carrying, non-rotatably but axially displaceably, an engaging sleeve (53) with internal engaging teeth to, which, as the engaging sleeve is displaced in one direction, are insertable into engagement with corresponding engaging teeth (54) on the synchronizing gear (32) to lock to the layshaft (12).

8. Gearbox according to claim 1, characterized in that the synchronizing gear (32) co-operating with the engaging means (50) is disposed to transmit torque to the second layshaft (15) via an idler gear (22) freely rotatably mounted on the main shaft (20).

9. Gearbox according to claim 1, characterized in that the synchronizing gear (33) co-operating with the engaging means (60) engages a tooted ring (13) disposed on one input shaft (9) and that the gear ratio therebetween is less than the gear ratio between the pringary gear (10) of the second input shaft (6) and the pringary gear (11) engaging therewith on the layshaft (12).

10. Gearbox according to claim 9, characterized in that the synchronizing gear (33) co-operating with the engaging means (60) engages a gear ring (13) disposed on one input shaft (9), said gear ring having a greater diameter than the pringary gear (10) of the second input shaft (6).

11. Gearbox according to claim 9, characterized in that the synchronizing gear (33) co-operating with the engaging means (60) has a gear ring of greater axial width than the gear ring on the second synchronizing gear (32).

12. Gearbox according to claim 9, characterized in that the engaging means (60) comprise an engaging hub (61) non-rotatably joined to the associated layshaft, said hub carrying non-rotatably but axially displaceably an engaging sleeve (63) with internal engaging teeth (62), which, upon displacement of the engaging sleeve in one direction, are insertable into engagement with corresponding engaging teeth (64) on the synchronizing gear (33) for locking the same to the layshaft (12).

* * * * *